(12) United States Patent
Fleischer (10) Patent No.: US 11,600,899 B2
(45) Date of Patent: Mar. 7, 2023

(54) ROUTE-BASED DIRECTIONAL ANTENNA

(71) Applicant: MiWire ApS, Hellebæk (DK)

(72) Inventor: David Fleischer, Hellebæk (DK)

(73) Assignee: MiWire ApS, Hellebæk (DK)

( * ) Notice: Subject to any disclaimer, the term of this patent is extended or adjusted under 35 U.S.C. 154(b) by 268 days.

(21) Appl. No.: 16/958,484

(22) PCT Filed: Dec. 28, 2018

(86) PCT No.: PCT/EP2018/097076
§ 371 (c)(1),
(2) Date: Jun. 26, 2020

(87) PCT Pub. No.: WO2019/129847
PCT Pub. Date: Jul. 4, 2019

(65) Prior Publication Data
US 2021/0066780 A1    Mar. 4, 2021

(30) Foreign Application Priority Data

Dec. 28, 2017    (EP) .................................. 17210918.3

(51) Int. Cl.
*H01Q 1/12* (2006.01)
*H01Q 1/22* (2006.01)
(Continued)

(52) U.S. Cl.
CPC ......... *H01Q 1/1257* (2013.01); *H01Q 1/2291* (2013.01); *H01Q 1/246* (2013.01);
(Continued)

(58) Field of Classification Search
CPC .... H01Q 1/1257; H01Q 1/2291; H01Q 1/246; H01Q 1/42; H01Q 3/04; H04W 48/20
See application file for complete search history.

(56) References Cited

U.S. PATENT DOCUMENTS 8,155,081 B1    4/2012 Mater et al.
9,565,625 B1 *  2/2017 MacNeille ............ H04W 48/18
(Continued)

FOREIGN PATENT DOCUMENTS

EP    1553789 A2    7/2005

*Primary Examiner* — Seokjin Kim
(74) *Attorney, Agent, or Firm* — Dinsmore & Shohl LLP (57) ABSTRACT

The present disclosure relates to an antenna device for a vehicle for optimizing the signal strength or quality from a mobile network having at least one fixed transceiver. The device comprises: at least one directional antenna; at least one turning device, such as an electric motor, for rotating the directional antenna around an axis substantially perpendicular to the antenna boresight; and a microprocessor configured to calculate an azimuthal rotation angle for pointing the directional antenna to at least one selected fixed transceiver. The calculated azimuthal rotational angle is based on: directional and positional data of the vehicle; positional data of the selected fixed transceivers; and a route for navigating the vehicle between a starting point and a destination. The azimuthal rotation angle of the directional antenna is calculated continuously or at intervals, such that the signal strength or quality from the mobile network is continuously optimized along the route. The present disclosure is further related to a directional wireless hotspot device for communication in a mobile network, wherein the device comprises at least two directional antennas. The present disclosure further relates to a method for automatically pointing a directional antenna on a vehicle to a fixed transceiver in a mobile network for optimizing the signal strength or quality, wherein the antenna is pointed to a transceiver based a calculated route for navigating between a starting point and a destination.

20 Claims, 7 Drawing Sheets

(51) Int. Cl.
*H01Q 1/24* (2006.01)
*H01Q 1/32* (2006.01)
*H01Q 1/42* (2006.01)
*H01Q 3/04* (2006.01)
*H04W 48/20* (2009.01)

(52) U.S. Cl.
CPC ............ *H01Q 1/3275* (2013.01); *H01Q 1/42* (2013.01); *H01Q 3/04* (2013.01); *H04W 48/20* (2013.01)

(56) References Cited

U.S. PATENT DOCUMENTS

| | | | |
|---|---|---|---|
| 2004/0108963 A1* | 6/2004 | Clymer | H01Q 1/28 343/837 |
| 2014/0067257 A1 | 3/2014 | Dave et al. | |
| 2015/0155904 A1* | 6/2015 | Ingalls | H01Q 1/526 455/562.1 |
| 2015/0197010 A1 | 7/2015 | Ruuspakka et al. | |
| 2016/0269132 A1* | 9/2016 | Clark | H04B 17/318 |
| 2017/0150373 A1 | 5/2017 | Brennan et al. | |
| 2017/0373384 A1* | 12/2017 | MacNeille | H01Q 13/106 |
| 2018/0175477 A1* | 6/2018 | Goth | H01Q 1/28 |
| 2019/0123433 A1* | 4/2019 | Lee | H04W 16/28 |
| 2019/0237850 A1 | 8/2019 | Fleischer et al. | |
| 2020/0205230 A1* | 6/2020 | Haustein | H04W 36/14 |

* cited by examiner

ROUTE-BASED DIRECTIONAL ANTENNA

CROSS-REFERENCE TO RELATED APPLICATIONS

This application is the U.S. national stage of PCT/EP2018/097076 filed Dec. 28, 2018, which claims priority of European Patent Application 17210918.3 filed Dec. 28, 2017.

FIELD OF THE INVENTION

The present invention relates to a device and a method for improving the connectivity from a vehicle to a mobile network based on the route that the vehicle navigates.

BACKGROUND OF THE INVENTION

Mobile connectivity depends on many factors, e.g. distance to the cell tower, obstacles obstructing the path to the cell tower, orientation of the mobile device and user traffic on the cell tower. In remote areas or in case of many obstacles in the path to the cell tower, the connectivity may be problematic and result in poor transfer speed or loss of connectivity. For mobile communication devices, such as mobile phones/smartphones an omni-directional antenna is advantageous and sufficient as the signal strength does not depend on the orientation of the antenna. But when moving during transport in a vehicle from one area to another, the connection to the mobile network will vary due to the position and location. For example, a vehicle travelling in a region between two transceivers may be prone to multiple switches over a short amount of time. For this reason, there is a need for a device for a vehicle that manages and improves the connectivity to a mobile network during transport in said vehicle. I.e. one purpose of the present disclosure is therefore to optimize the network connectivity for a vehicle.

SUMMARY OF THE INVENTION

The present disclosure therefore relates to an antenna device for a vehicle for optimizing the signal strength or quality from a mobile network having at least one fixed transceiver, the antenna device comprising a directional antenna because a directional antenna provides a much stronger signal—when pointing in the right direction. I.e. the directional antenna needs to be pointed at a transceiver to obtain a strong signal. An example of a directional antenna is described in pending patent application PCT/EP2017/065043. The term 'mobile network' may, within the present disclosure, be construed as any network comprising fixed transceivers or base stations. A mobile network may also include several mobile networks. A directional antenna device may advantageously be mounted in or on a vehicle, such as a car, or a watercraft vehicle, such as ship, ferry or boat, and work with software ensuring that it is pointed at a cell tower, preferably at all times. It is however likely that the optimal orientation of a directional antenna changes often and there is a need to determine the optimal orientation of the direction antenna during transport in the vehicle.

The inventor has realized that a directional antenna can be used in a moving vehicle to maintain an optimized connection in terms of data or signal quality and/or strength along a route. Preferably, the antenna device is configured to operate in an existing mobile network without modification of the network. The mobile network may be a standard, commercially employed and public 2G, 3G, 4G or 5G network. The antenna device may therefore be configured to use a communication standard or protocol selected from GSM, UMTS, LTE and 5G protocols, wherein the antenna device is configured to operate in the range of 700-2600 MHz, or specifically in the range of 1600-2800 MHz or in the range of 1800-2600 MHz. 5G New Radio can include lower frequencies, from 600 MHz to 6 GHz. The antenna device may consequently be configured to operate in the range of 600 MHz to 6 GHz. The antenna device may also be configured to operate in a WLAN, operating in for example the 2.4 GHz and 2.5 GHz bands or 5 GHz bands. By taking into account the geographical placement of the fixed transceivers of the network and rotating the directional antenna based on the directional and positional data of the vehicle, the positional data of the selected fixed transceivers, and the route for navigating the vehicle between a starting point and a destination, an optimized signal strength/quality and/or data connection can be maintained. In contrast to system operating in dedicated networks, the present antenna device may operate in an existing network where other users may also be present. This may add complexity to the optimal direction along the route. For this reason the antenna device may operate using predetermined directional maps and routes but may also operate dynamically by scanning the environment.

The presently disclosed antenna device preferably comprises at least one directional antenna; at least one turning device, such as an electric motor, for rotating the directional antenna around an axis substantially perpendicular to the antenna boresight; and a microprocessor configured to calculate an azimuthal rotation angle for pointing the directional antenna to at least one selected fixed transceiver. The calculated azimuthal rotational angle is preferably based on one or more of the following: directional and positional data of the vehicle; positional data of the selected fixed transceivers or information about a signal strength or signal quality for different directions along the route; and a route for navigating the vehicle between a starting point and a destination. The azimuthal rotation angle of the directional antenna can be calculated continuously or at intervals, such that the signal strength or quality from the mobile network can be continuously optimized along the route.

The antenna device may operate in two operation modes. The first operation mode corresponds to the process of controlling the directional to maintain an optimized data connection for example by optimizing the signal strength or signal quality from the mobile network, or maximizing the data transfer rate, along a route by calculating the azimuthal rotation angle of the directional antenna continuously or at intervals. A second operation mode includes scanning of environment by rotating the directional antenna and measuring one or more parameters related to signal strength, signal quality, latency, frequency, bandwidth or an obtainable data rate between the fixed transceiver and the antenna device for a number azimuthal positions. The parameter(s) may be used to update the directional antenna instantly after a scanning procedure or to build a directional map of signal strengths, signal quality and/or, latency, frequency, bandwidth obtainable data rates for different directions and for different geographical positions along the route. In one embodiment, separate rotatable directional antennas are used for the data connection and for the scanning process.

The present disclosure further relates to a method for automatically pointing a directional antenna to a fixed transceiver in a mobile network for optimizing the signal strength or quality. The method comprises the steps of:

obtaining the geographical position and/or direction of travel and/or speed of the vehicle; obtaining or extracting the geographical position for at least one fixed transceiver; obtaining a reference azimuth corresponding to the direction of the directional antenna in a horizontal plane; and calculating a pointing azimuth between the vehicle and a selected fixed transceiver. In a first embodiment the pointing azimuth is calculated based on one or more of the following: the geographical positions for the selected fixed transceiver and the vehicle; and a calculated route for navigating between a starting point and a destination. The method may further comprise the steps of: calculating an azimuthal rotation angle between the reference azimuth and the pointing azimuth; rotating the directional antenna towards the selected fixed transceiver based on the calculated azimuthal rotation angle; and optionally continuously, or at intervals, repeating the previous steps of the method. The presently disclosed method can be applied to a directional antenna located on a vehicle.

The presently disclosed device and method thereby takes the route of the vehicle into account when determining the optimal orientation of the directional antenna. The optimal orientation of the directional antenna may be estimated along a route based on a directional map of signal strengths, signal quality and/or obtainable data rates along the route. The orientation of the directional antenna along an expected route may thereby be calculated in advance. During a journey the directional antenna does not have to be reactive but can also be proactive in the sense that it will be aware of expected handovers along the route before they occur. The directional map may for example include data that has been collected during a previous journey along the same route. Based on the directional map, or based on a known predetermined route and known positions of transceivers along the route, antenna orientations the route can be calculated in advance or during the journey.

During switch from one transceiver to another the directional antenna may not point to a transceiver for some time during switching and possibly has to re-establish a connection when pointing to a new transceiver. One solution is therefore to have two (or more) directional antennas.

The present disclosure further relates to a directional wireless hotspot device incorporating the antenna device disclosed herein. The directional wireless hotspot device is suitable for communication in a mobile network having a number of distributed cells, each cell covered by at least one fixed transceiver. In one embodiment the hotspot device comprises: at least one printed circuit board; at least two directional antennas; at least one compass, such as a magnetometer; at least one geographical positioning device, such as a GPS receiver; at least one electric motor, such as a substantially flat motor, e.g. an electric motor such as a piezoelectric motor, for rotating the at least two directional antennas; at least one wireless modem, such as a 3G/4G/LTE/5G modem, or a receiving element, such as a socket, arranged to receive an external wireless modem; at least one local communication element, such as a Wi-Fi circuit or any other wireless or even wired communication unit, for communication with a local device. The wireless hotspot device further comprises at least one microprocessor configured to calculate an azimuthal rotation angle for pointing the directional antennas to at least one of the fixed transceivers based on: directional and positional data from the compass and geographical positioning device; and positional data of the fixed transceivers. In a first embodiment the rotational axes of the at least two directional antennas do not coincide and the at least two antennas are preferably configured to rotate independently. The wireless hotspot device may comprise any embodiment of the presently disclosed antenna device for a vehicle.

The presently disclosed antenna device for a vehicle for optimizing the signal strength from a mobile network and/or directional wireless hotspot device for communication in a mobile network may be configured for carrying out the method for automatically pointing a directional antenna to a fixed transceiver in a mobile network for optimizing the signal strength.

DETAILED DESCRIPTION OF THE INVENTION

The directional antenna described in pending patent application PCT/EP2017/065043 is hereby incorporated by reference in its entirety.

A vehicle as used herein is a mobile machine that transports people or cargo, such as wagons or bicycles, motor vehicles such as motorcycles, cars, trucks or buses, or railed vehicles such as trains or trams, or watercraft vehicles, such as ships, ferries or boats.

The presently disclosed device may use the method for automatically pointing its directional antenna to a base station in the mobile network it is active in. The method can be said to employ dynamic handling of the direction based on the position of the device in relation to a plurality of base stations. The device will either know the positions of the base stations/transceivers and update its own position and direction continuously, or receive information from the base stations, or scan for the base stations/transceivers. Such information can be provided by the network operator. The device using the method is thereby functional both when it stands still and camps on one cell and in mobility scenarios, for example when the device is mounted or placed in a moving vehicle or vessel, as disclosed herein. The presently disclosed method handles mobility scenarios dynamically, preferably in substantially real-time, and may for example update the cell ID, positional data of the corresponding fixed transceiver, pointing azimuth and azimuthal rotation angle based on a new cell when the wireless communication device is updated to camp on a new cell of the mobile network in a reselection process and based on the known route of the vehicle.

The signal strength or quality from the mobile network may be measured using an arbitrary strength or quality unit such as the received signal strength indicator (RSSI), the received signal code power (RSCP) or the reference signal received power (RSRP), or the reference signal received quality (RSRQ) or a signal-to-noise parameter, or any other suitable parameter related to for example an obtainable bandwidth or data rate, latency. The mobile network has a number of cell towers, or transceivers. The location of the transceivers may be stored in a memory unit in the device such that the location of nearby transceivers may be determined from the stored data. In one embodiment the route is obtained from a built-in navigation system in the vehicle, or a mobile device, such as a phone or tablet, or a predefined route stored in the vehicle or the antenna device. The route may be a predefined route for a predefined journey. Information about a signal strength, signal quality or obtainable data rates for different directions along the route may be provided. As an example, for a specific journey, information about the optimum pointing direction of the directional antenna may be provided as a predefined list of directions, optionally including a preferred base station for each direction, for a number of geographical points along the route.

Preferably, the antenna device is configured to operate in an existing mobile network without modification of the network. The mobile network may be a standard, commercially employed and public 2G, 3G, 4G or 5G network. The antenna device may therefore be configured to use a communication standard or protocol selected from GSM, UMTS, LTE and 5G protocols, wherein the antenna device is configured to operate in the range of 700-2600 MHz, or specifically in the range of 1600-2800 MHz or in the range of 1800-2600 MHz. 5G New Radio can include lower frequencies, from 600 MHz to 6 GHz. The antenna device may consequently be configured to operate in the range of 600 MHz to 6 GHz. By taking into account the geographical placement of the fixed transceivers of the network and rotating the directional antenna based on the directional and positional data of the vehicle, the positional data of the selected fixed transceivers, and the route for navigating the vehicle between a starting point and a destination, an optimized data connection can be maintained.

The route may be used for selecting the fixed transceiver that the directional antenna is pointed to. In one embodiment the transceiver that the directional antenna should be pointed to for each point along the route is determined prior to departure based on the route. The transceiver that the directional antenna is pointed to may also be determined while navigating the route. In another embodiment the device uses the location and speed of the vehicle and the route to determine the location of the vehicle at a predetermined time into the future, such as about 1, 5 or 10 seconds, or 30 seconds, or 1 minute, or 2 minutes, or 5 minutes into the future. This future location may then be used to determine if the directional antenna should be pointed towards another transceiver, which transceiver it should be pointed to, and at which time to point the antenna towards another transceiver.

In some situations the antenna may switch between transceivers without it being necessary. This could occur if the switching is based on distance to the transceivers or the signal strength. For example, a car driving on a route going between two transceivers may cause the antenna to switch between the antennas more times than needed, thereby causing signal disruption and possibly loss of connection. The device may therefore advantageously be configured for maintaining the connection to a given transceiver when the route shows that it is not necessary to switch to another transceiver. This may be advantageous even though the other transceiver is closer to the vehicle or has greater signal strength.

In another embodiment the next transceiver the directional antenna is pointed to is determined based on the route, such that the transceiver is located in the general direction of travel of the vehicle. This means that the transceiver will be able to cover a larger part of the route, which may lower the number of station handovers necessary for navigating the route. During a station handover, the directional antenna is rotated from pointing towards one transceiver to pointing towards another transceiver. During this process, the connection to the mobile network may be lost, and the number of handovers is therefore preferably minimized.

In some situations it may be important to maintain the connection to the mobile network during the trip. Therefore, in one embodiment the route is calculated based on geographical connectivity data such that the risk of low or no connectivity along the route is low. Alternatively, a topology map may be used to predict signal strength from transceivers along the route. A topology map may also be used to calculate a route with good connectivity to the mobile network. This can be based on the topology map together with information of the transceivers, such as location, tower height and frequency. In one embodiment the antenna device is configured for storing data from previous routes to optimize the connectivity when the route, or a part thereof, is navigated again.

In one embodiment the directional and positional data of the vehicle are obtained from a geographical positioning device, such as a GPS. The geographical positioning device may be an integral part of the antenna device or it may be part of the vehicle. The direction of travel and velocity of the vehicle may in one embodiment be determined based on consecutive GPS measurements. In another embodiment the directional data is obtained from a compass or magnetometer. The compass or magnetometer may be an integral part of the antenna device or it may be part of the vehicle. Alternatively a gyroscope may be used to determine the direction of travel or to verify or assist measurements of the direction of travel from other units. A gyroscope or accelerometer may also be configured for detecting the pitch or tilt of the vehicle, such that the antenna device can compensate said pitch or tilt. This compensation may in one embodiment be accomplished using a gimbal for maintaining the device in a horizontal position.

The signal from the directional antenna is preferably provided to a wireless modem, such as a 3G/4G/LTE/5G modem, or a receiving element, such as a socket, arranged to receive an external wireless modem. In one embodiment the signal from the antenna device is used for creating a wireless network, such as a Wi-Fi hotspot, in and around the vehicle. Such a hotspot may be used to connect mobile devices in or near the vehicle to the mobile network. Alternatively, the signal from the antenna device may be used for a wired connection, such as an Ethernet connection, to the vehicle and/or devices in the vehicle.

In one embodiment of the invention the antenna device is configured for operation in frequencies in the range of 500 MHz to 60 GHz, or in the range of 700-2600 MHz. In another embodiment the directional antenna is a Vivaldi antenna, preferably made of dielectric plate metalized on both sides. The directional antenna may also be fabricated on a printed circuit board. In another embodiment the directional antenna is mounted on the upper side of a printed circuit board and additional components are mounted on the back side of the printed circuit board. This may be advantageous as many components can be gathered on the rotating part of the device, which can eliminate possible complications from transferring the signal to stationary parts of the device.

The antenna device may also comprise an omnidirectional antenna. In one embodiment the device is configured for combining the directional signal with an omnidirectional antenna signal. The omnidirectional antenna may be an integral part of the antenna device or it may be part of the vehicle. In another embodiment the antenna device is configured for detecting the signal strength of the transceivers by means of the omnidirectional antenna signal to determine which transceiver the directional antenna should be pointed to. In yet another embodiment the omnidirectional antenna may be used for providing the signal when the signal strength from the directional antenna is low. This may be in situations where the directional antenna is not pointed towards a transceiver, e.g. when rotating the antenna to point towards another transceiver, or if obstacles lower the signal strength between the device and the transceiver that the directional antenna is connected to. The omnidirectional antenna may also be used in combination with the directional antenna for carrier aggregation, multiple input multiple output (MIMO) or bundling of the signals.

In one embodiment of the invention, the antenna device further comprises at least a second rotatable directional antenna. The second directional antenna may be configured for pointing to a different transceiver than the selected transceiver for the first directional antenna. In one embodiment the first rotational axis of the first directional antenna is different from the rotational axis of the second directional antenna. The two antennas may thereby be mounted next to each other in or on the vehicle. In another embodiment the antenna device is configured for maintaining the connection through one directional antenna when the other directional antenna is rotated to point and connect to a different transceiver. The two directional antennas may also be used for carrier aggregation or for bundling the signals.

The antenna device may also be arranged such that rotation of the directional antenna more than a predefined angle, such as 360° or 540° or 720°, is prevented. In one embodiment the antenna is rotated 360°, or a value corresponding to the predefined angle, backwards when the predefined angle is reached.

The presently disclosed invention is further related to a vehicle equipped with the antenna device according to the first aspect of the invention. Advantageously the antenna device is mounted in the roof, on top of the roof or at another high location on the vehicle. The vehicle may be a car, a truck, a bus or a train. Alternatively the vehicle is a motorcycle. The antenna device may also be mounted on a water-based vehicle, such as a ship or a ferry or a submarine. For all types of vehicles, the vehicle may either be operated by a human, or it may be remotely controlled, or it may be autonomous.

The antenna device may operate in two operation modes. The first operation mode corresponds to the process of controlling the directional to maintain an optimized data connection. In a second operation mode, the antenna device may be configured to rotate the directional antenna to scan for and identifying fixed transceivers of the mobile network, and for each identified fixed transceiver measuring a parameter related to a signal strength, a signal quality or an obtainable data rate between the fixed transceiver and the antenna device for a number azimuthal positions. If the scanning is performed over time for a moving vehicle, data records can be stored, which comprise a number of strength/quality/data rate parameters for a plurality of directions and for a plurality of geographical positions along the route. The first operation mode can use this data to optimize the direction of the directional antenna if the same or a similar route is taken in a future journey. Preferably, the rotation and measurements of the second operation mode are performed for a plurality of geographical positions along the route. The antenna device may comprise a switch for switching between the first and second operation modes. The scanning may be performed over 360°, either continuously or for a number of predefined angles. The antenna device may generate a directional map of signal strengths, signal quality and/or obtainable data rates along the route. The directional map may then be used in the first operation mode to optimize the data connection along a given route.

Two Directional Antennas

The presently disclosed antenna device may further comprise a second rotatable directional antenna, wherein the first and second rotatable antennas are configured to rotate independently of each other.

The second rotatable antenna can be used for different tasks and purposes. It may be used for smooth transition from one fixed transceiver to another. The first and second antennas may also be used for operating in the first and second operation modes, respectively. In one embodiment, the first rotatable directional antenna is used for maintaining an optimized data connection whereas the second rotatable directional antenna is used for generating the directional map of signal strengths, signal quality and/or obtainable data rates for a plurality of geographical positions along the route. The directional map can thereby be used instantly and stored for future use.

When using two or more antennas, the antennas may be equipped with, or using, different SIM cards, including for example eSIM and Remote SIM Provisioning (RSP) or other associations of identity. In one embodiment of the presently disclosed antenna device, the first rotatable directional antenna is associated with a first international mobile subscriber identity (IMSI), preferably wherein the first international mobile subscriber identity is stored in a first subscriber identification module (SIM), and the second rotatable directional antenna is associated with a second international mobile subscriber identity, preferably wherein the second international mobile subscriber identity is stored in a second subscriber identification module.

A stated above the present disclosure further relates to a directional wireless hotspot device for communication in a mobile network, wherein the device comprises at least two directional antennas. The two antennas may be mounted on top of each other to form one compact device. However, the received signals and signals from other components may interfere and cause problems in this configuration. Therefore in one embodiment the rotational axes of the at least two directional antennas do not coincide. Furthermore, the device may be configured such that the at least two antennas can rotate independently, e.g. such that antennas can point to different transceivers. However, the at least two directional antenna may also point to the same transceiver and e.g. use carrier aggregation. The device may advantageously be configured for maintaining the connection through one antenna when the other is rotated to point and connect to a different transceiver. During handover one antenna is rotated from pointing towards a first transceiver to pointing towards a second transceiver. While rotating the antenna, the signal from the first transceiver may be lost, and the connection to the mobile network is lost until a connection to the second transceiver is established. The device is advantageously configured such that the connection is maintained through the second antenna during this time.

In one embodiment the device further comprises an omni-directional antenna, which may be used to determine the signal strength from nearby transceiver. The omni-directional antenna may also be used for maintaining the connection to the mobile network in case the connection is lost from the at least two directional antennas. In another embodiment the at least two directional antennas, and possibly also the omni-directional antenna, are used for carrier aggregation or for bundling the signals.

The at least two antennas may be mounted on separate rotatable devices and then provide the received signal to a central unit decoding the signals from the antennas and controlling the rotation of the antennas. However, transferring the signal from the antenna to a wireless modem can be challenging. Therefore, in a further embodiment of the invention, for each antenna, the device further comprises one or more of:

a printed circuit board; a compass, such as a magnetometer;
a geographical positioning device, such as a GPS receiver;
any suitable turning device for turning/rotating the antennas, including an electric motor, such as a substantially flat piezoelectric motor, for rotating the at least two directional antennas;
a wireless modem, such as a 3G/4G/LTE/5G modem, or a receiving element, such as a socket, arranged to receive an external wireless modem;
a local communication element, such as a Wi-Fi unit, Bluetooth unit or the like, for communication with a local device;
and a microprocessor configured to calculate an azimuthal rotation angle for pointing the directional antennas to at least one of the fixed transceivers.

In one embodiment each antenna is an independent antenna device for pointing a directional antenna to a transceiver. In another embodiment the antenna device comprising two independent antennas is configured for working together using software and/or hardware to control the movement of the two independent antennas. The signal from two or more antennas may be transferred to a common board by means of wireless technology, such as Wi-Fi, Bluetooth or other short distance, high bandwidth wireless data transfer technology.

The present disclosure further relates to an antenna device for a vehicle for optimizing the signal strength from a mobile network having at least one fixed transceiver, the device comprising:

a plurality of directional antennas mounted in different fixed directions perpendicular to the antenna boresight; and
a microprocessor configured to select one of the fixed directional antennas continuously, or at intervals, such that the signal strength from the mobile network is continuously optimized along the route based on:
  i. directional and positional data of the vehicle;
  ii. positional data of the selected fixed transceivers; and
  iii. a route for navigating the vehicle between a starting point and a destination.

The directional antennas are thereby fixed in relation to the device and also in relation to the vehicle if the device is mounted on the vehicle. The arrangement may comprise at least 3, preferably at least 4, even more preferably at least 5 fixed directional antennas pointing in different directions. The plurality of directional antennas may be distributed, such as evenly distributed, over 360° of the rotational space. The arrangement can be seen as an alternative to continuously rotating the rotatable directional antenna. This setup may also use a further rotatable directional antenna and at least one motor for rotating the rotatable directional antenna around an axis substantially perpendicular to the antenna boresight. In such a configuration the plurality of fixed directional antennas may be operated in the first operation mode, whereas the rotatable directional antenna is operated in the second operation mode as described above. As would be understood by a person skilled in the art, the technical details and embodiments disclosed for the antenna device having the rotatable directional antenna may also be applied to the embodiment having a plurality of of directional antennas mounted in fixed positions.

The presently disclosed antenna device may further comprise one or more slip rings for transmission of data signals to and from the directional antenna and printed circuit board. The data signals may then be further communicated by physical wires, such as a registered jack (RJ), on the part the device that does not rotate. Slip rings are useful for transmitting power and/or electrical signals from a stationary to a rotating structure.

DETAILED DESCRIPTION OF THE DRAWINGS

Figure 1:
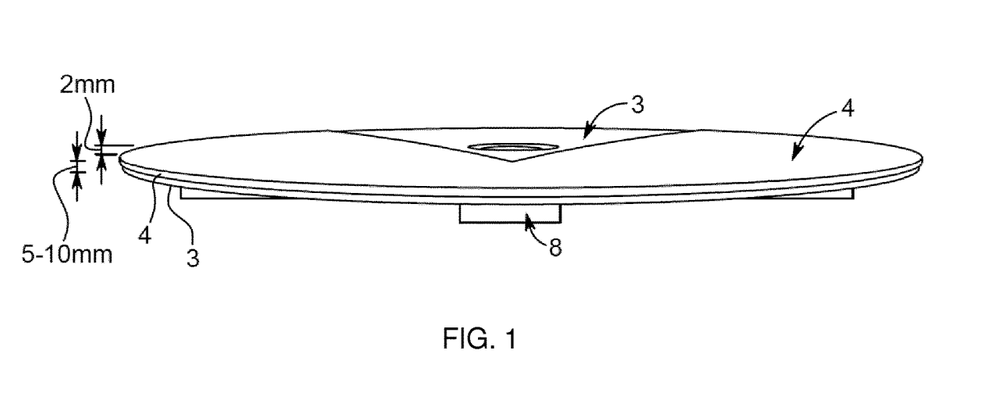
FIG. 1 shows one embodiment of the PCB subsystem, wherein the antenna is mounted on the front side of a circular PCB.

FIG. 1 shows one embodiment of the PCB subsystem 2, wherein the (planar) antenna 4 is mounted on the front side of a circular PCB 3. It is indicated that in this embodiment the planar antenna has a height of approximately 2 mm.

Figure 2:
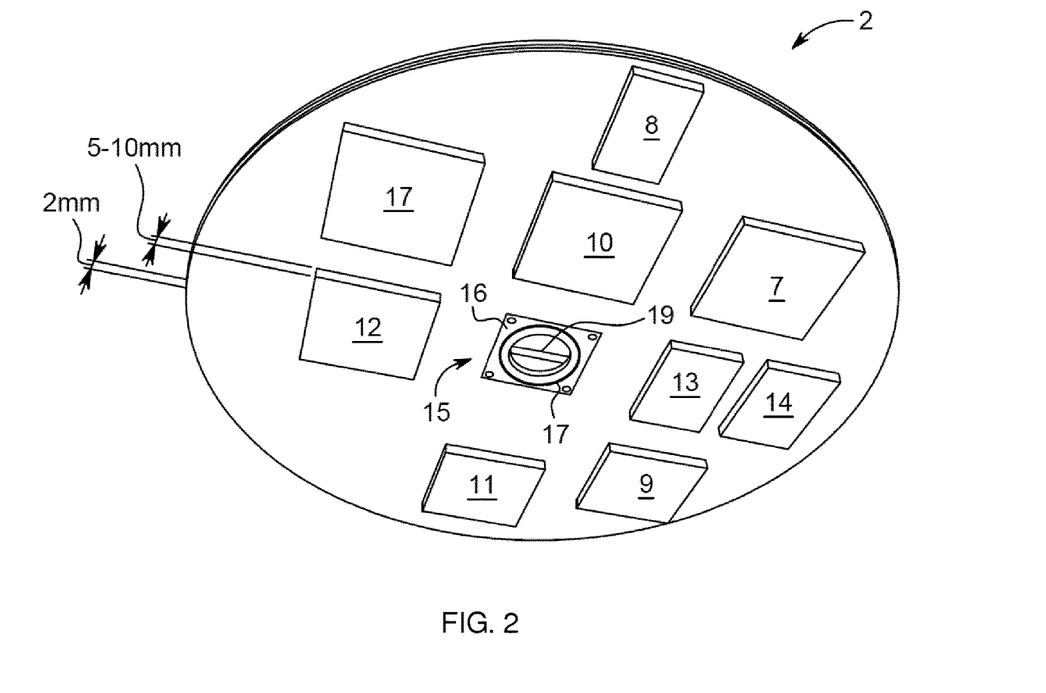
FIG. 2 shows the embodiment of FIG. 1 with the rest of the components of the PCB subsystem on the backside of the PCB.

FIG. 2 shows the embodiment of FIG. 1 with the components, including a processing unit 7, a SIM card holder 8, a magnetometer 9, a wireless modem 10, a Wi-Fi circuit 11, a GPS 12, an accelerometer 13, a gyro 14, a piezoelectric motor 15, a processing unit 17 for controlling the piezoelectric motor 15 are mounted on the backside of the PCB 3. It is indicated that in this embodiment the PCB 3 and the components have a height of approximately 5-10 mm. The piezoelectric motor 15 has a frame 16 and a rotor ring 17. The PCB 3, the antenna 4 and the piezoelectric motor 15 have a coinciding hole 19.

Figure 3:
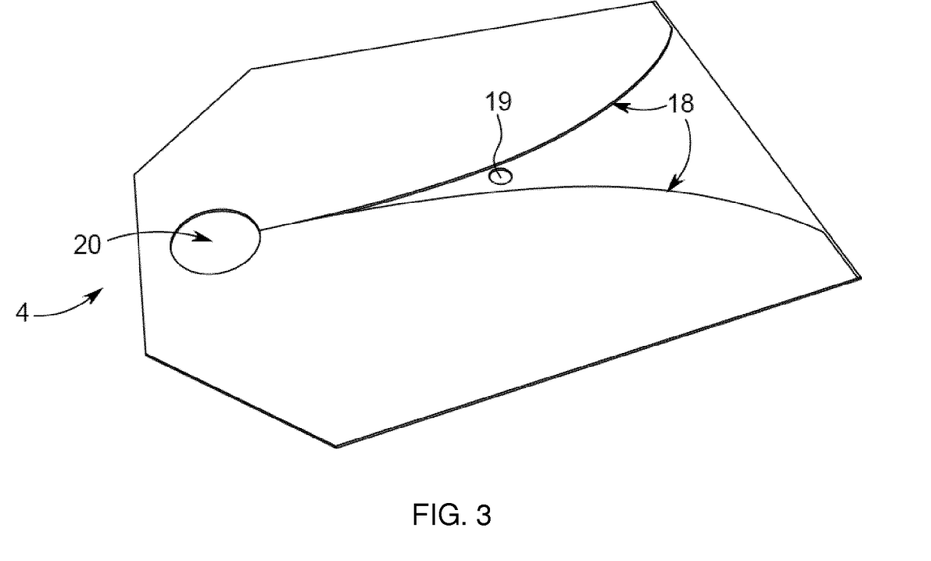
FIG. 3 shows one example of a planar directional antenna, a Vivaldi antenna.

FIG. 3 shows one example of a Vivaldi antenna 4 having a tapered slot. A metal sheet has one upper and one lower part, whose facing edges 18 define a tapered slot between the upper and lower parts. There is a hole 19 through the PCB 3 in the tapered slot. There is also a circular cut out 20.

Figure 4:
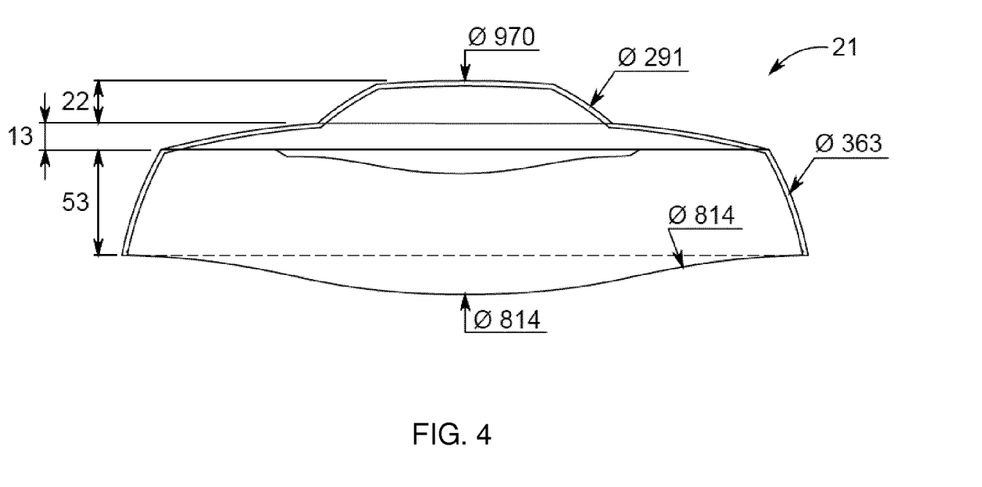
FIG. 4 shows one embodiment of an upper part of the housing of the wireless hotspot device.

FIG. 4 shows one embodiment of a possible shape of the housing of the wireless hotspot device 1 with indicated dimensions.

Figure 5:
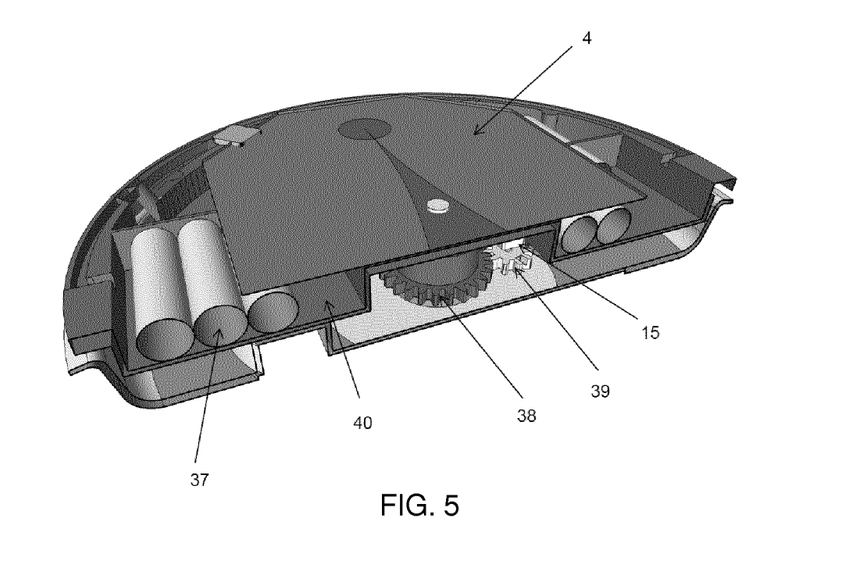
FIG. 5 shows a further embodiment of the antenna device.
Figure 6:
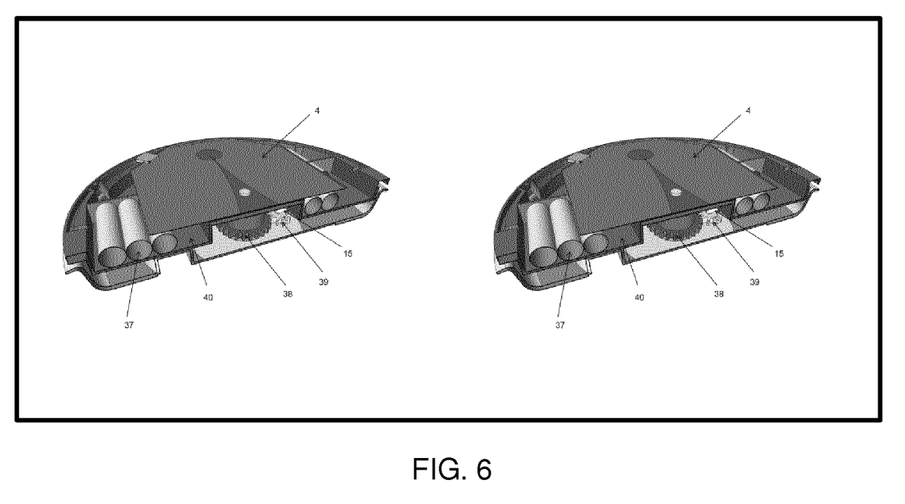
FIG. 6 shows another embodiment of the antenna system in which two directional antennas according to the embodiment in FIG. 5 are mounted on non-coinciding axes and may be rotated independently.

FIG. 5 shows another embodiment of the directional wireless hotspot device 1 having an electric DC motor 15 connected to a cogwheel 39 engaging a second cogwheel 38 in order to rotate the directional wireless hotspot device 1. A number of batteries 37 are arranged in a PCB subsystem on an assembling element 40 which is also part of the PCB subsystem FIG. 6 shows yet another embodiment of the antenna system in which two directional antennas according to the embodiment in FIG. 5 are mounted on non-coinciding axes and may be rotated independently.

Figure 7:
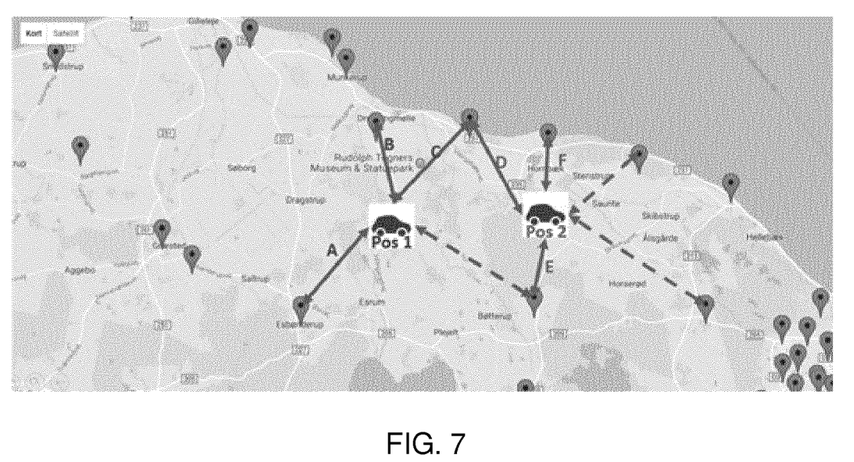
FIG. 7 shows an example where connections to nearby transceivers are illustrated for a car driving from one location to another.

FIG. 7 is an example of the use of one embodiment of the present invention. A vehicle equipped with one embodiment of the present invention starts in position 1, where it has connection A with an omni-directional antenna, connection B with a first directional antenna and connection C with a second directional antenna. When driving to position 2, the transceivers become out of reach and at some point the directional antennas are each rotated to connect to a new antenna. This process preferably occurs independently for each directional antenna in order to maintain a connection through a directional antenna. The route between position 1 and position 2 may advantageously be used to determine when to connect to a new transceiver and which transceiver the antenna device should connect to. Preferably the device connects to transceivers along the route ahead of the vehicle such that the number of handovers is minimized. When the vehicle is at position 2 the antenna device has performed handovers such that it is now has connection D with the omni-directional antenna, connection E with directional antenna 1 and connection F with directional antenna 2.

Figure 8:
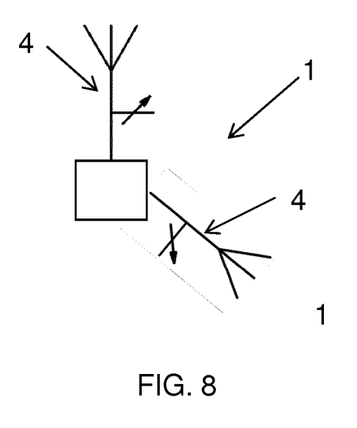
FIG. 8 shows an embodiment of the presently disclosed antenna device having two directional antennas.

FIG. 8 shows an embodiment of the presently disclosed antenna device 1 having two directional antennas 4. One of the antennas 4 may be used for maintain an optimized data connection, whereas the other may be used to scan the environment and generate a directional map of signal strengths, signal quality and/or obtainable data rates along the route.

Figure 9:
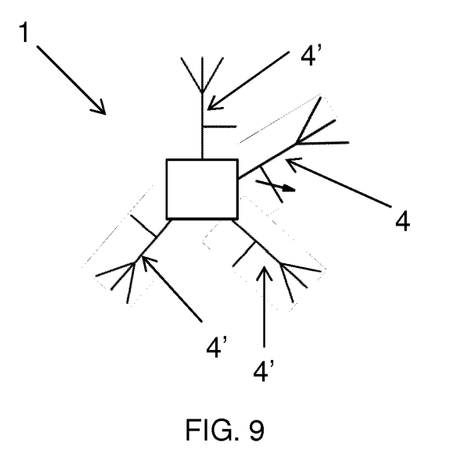
FIG. 9 shows an embodiment of the presently disclosed antenna device having three directional antennas that are fixed relative to the device and one directional antenna that is rotatable around an axis of the device.
Figure 10:
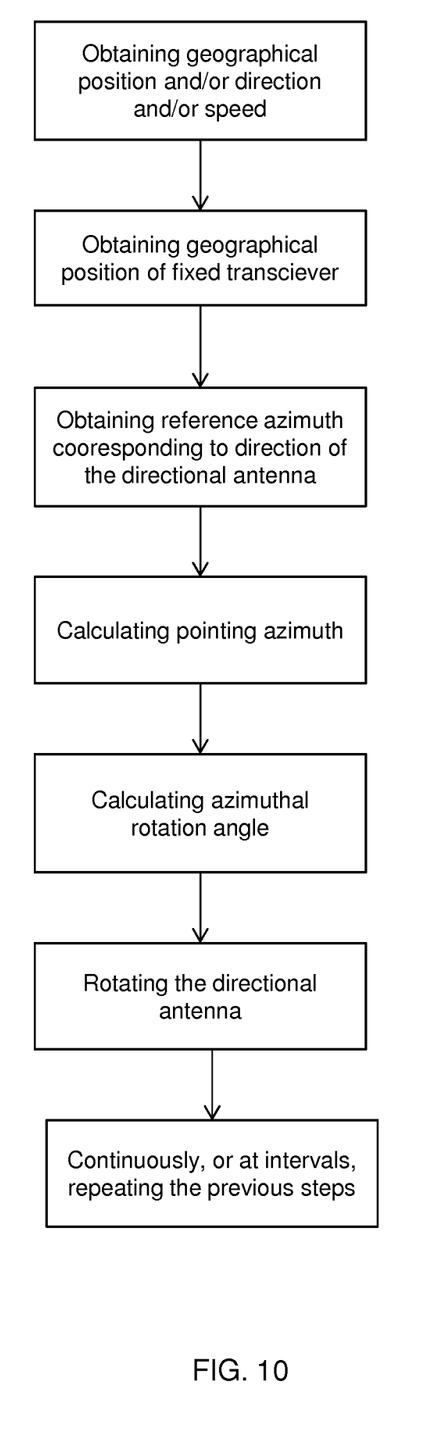
FIG. 10 shows an embodiment of the presently disclosed method for automatically pointing a directional antenna on a vehicle to a fixed transceiver in a mobile network.

FIG. 9 shows an embodiment of the presently disclosed antenna device 1 having three fixed (fixed relative to the device or to the vehicle) directional antennas 4'. The antenna device further comprises one rotatable directional antenna 4. The antenna device can select between the three fixed directional antennas based on the directional and positional data of the vehicle and positional data of the selected fixed transceivers. The additional rotatable directional antenna 4 can be used to scan the environment continuously.

Figure 11:
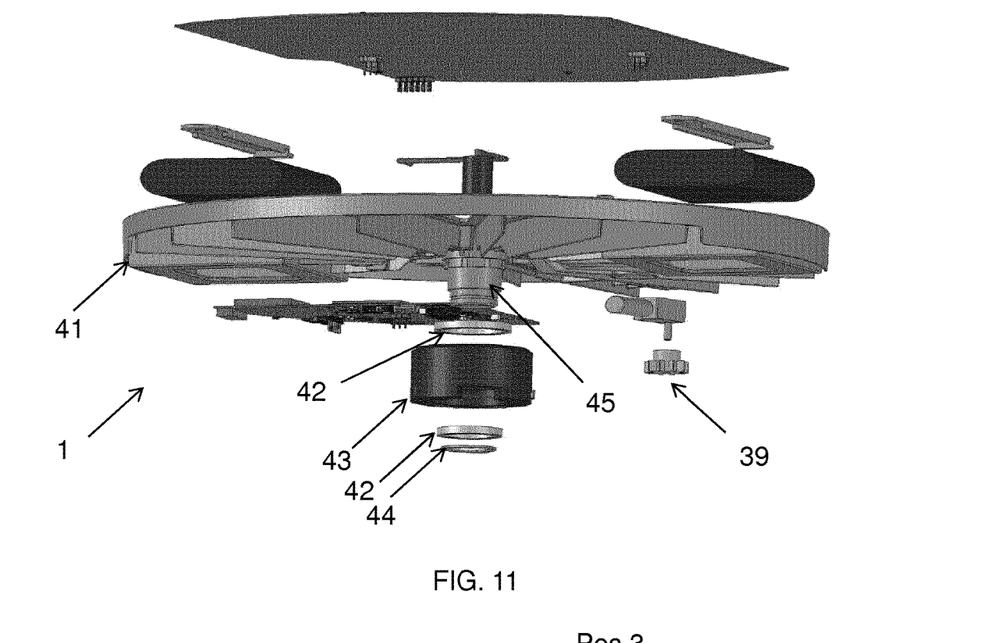
FIG. 11 shows a further embodiment of the antenna device.

FIG. 11 shows a further embodiment of the antenna device. A rotatable platform 41 may carry a PCB and one or more directional antennas. The rotatable platform is connected to a rotatable shaft (which may have a slip ring). The connection between the rotatable and fixed structures comprises ball bearings 42, a bearing housing 43, and a locking ring 44. A cog wheel 39 is placed at a certain minimum distance from the center of the rotatable shaft 45.

Figure 12:
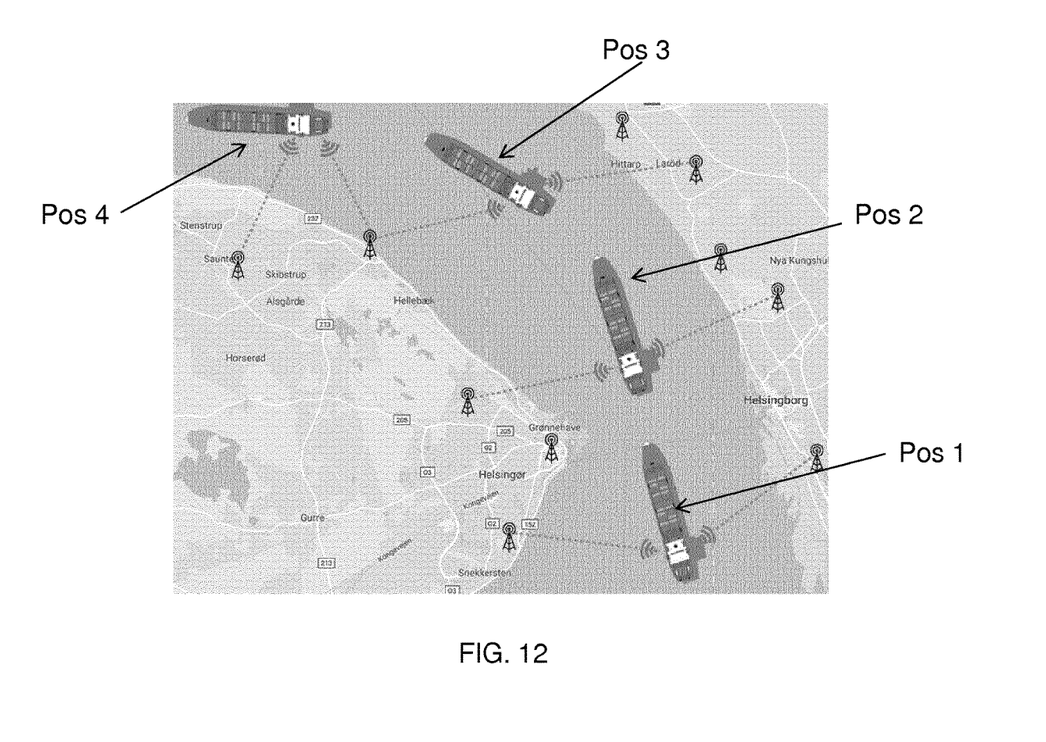
FIG. 12 shows an example where connections to nearby transceivers are illustrated for a ship going from one location to another. In the example the antenna device makes use of transceivers from two different countries.

FIG. 12 shows an example where connections to nearby transceivers are illustrated for a ship going from one location to another. In the example the antenna device makes use of transceivers from two different countries. In either one of Pos 1-Pos 4, one directional antenna, alternatively two directional antennas, may be directed towards different possible base stations to maintain an optimized connection in terms of data or signal quality and/or strength along the route.

Figure 13:
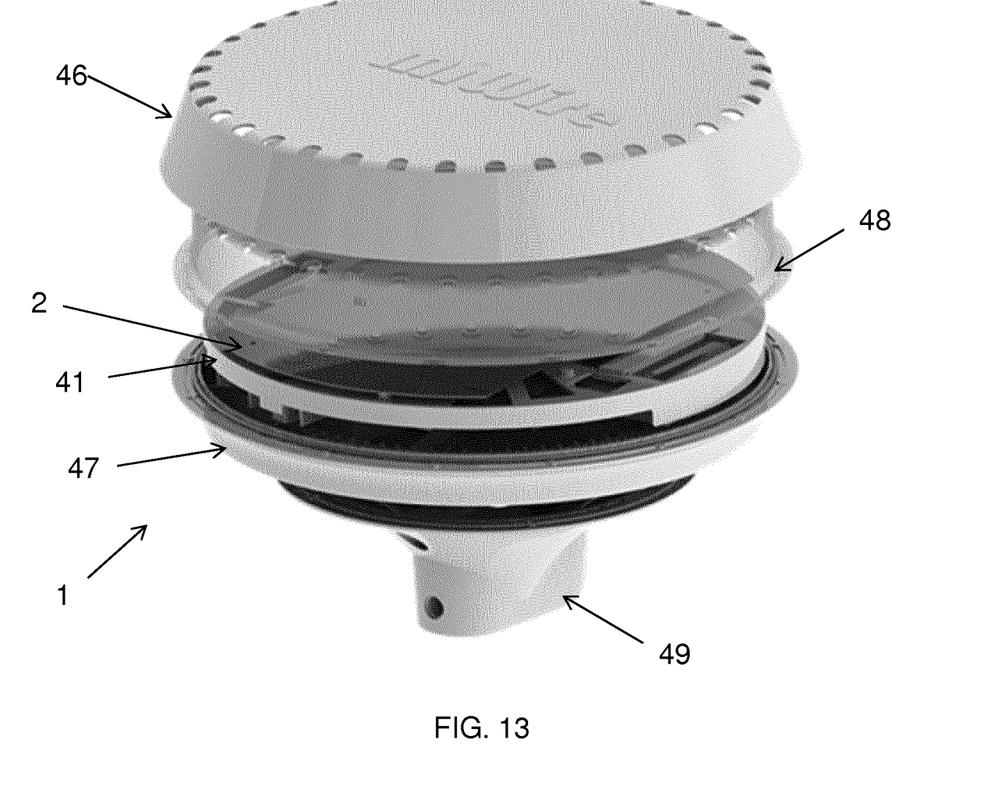
FIG. 13 shows a further embodiment of the antenna device.

FIG. 13 shows a further embodiment of the antenna device 1 with housing and a mounting bracket 49 for mounting the device to a vehicle. The housing comprises an upper housing portion 46, a lower housing portion 47 and an inner housing 48. A rotatable platform 41 carries a PCB subsystem 2.

EXAMPLES

An example of the use of one embodiment of the present invention may be given with reference to FIG. 7 illustrating the situation on a map. A car equipped with one embodiment of the present invention starts in position 1, where it has the following connections to transceivers:

Omni-directional antenna 0 connected to a transceiver through connection A with 800 MHz and −85 dBm.

Directional antenna 1 connected to a transceiver through connection B with 2600 MHz and −98 dBm.

Directional antenna 2 connected to a transceiver through connection C with 2100 MHz and −96 dBm.

The omni-directional antenna 0 is also listening for a signal from transceiver E, but the signal strength is too low at position 1. The destination at position B has been entered into the navigation system in the car or transferred form a mobile device to the car. A database shows that there is a transceiver working at a frequency of 1800 MHz with good coverage in the area that the car is moving towards.

Halfway or at some other advantageous point between position 1 and position 2, directional antenna 1 is turned to point in the direction of transceiver E. When turning the antenna the connection from antenna 1 is lost and has to be reestablished. During the time from starting to turn antenna 1 until the connection is reestablished, antenna 2 remains connected to transceiver C such that the connection to the mobile network is maintained at all times. When the car is at position 2 it now has the following connections to transceivers:

Omni-directional antenna 0 connected to a transceiver through connection D with 800 MHz and −87 dBm.

Directional antenna 1 connected to a transceiver through connection E with 1800 MHz and −80 dBm.

Directional antenna 2 connected to a transceiver through connection F with 2260 MHz and −90 dBm.

Data relating to the mobile connection while navigating the route is stored and may be used when the route is navigated again. This may help optimizing the connection to the mobile network, although the best connectivity may be achieved differently due to e.g. a different load on the transceivers.

Further Details of the Present Disclosure

The present disclosure may be described by the following items:

1. An antenna device for a vehicle for optimizing the signal strength from a mobile network having at least one fixed transceiver, the device comprising:
   at least one directional antenna;
   rotation means, such as at least one electric motor, for rotating the directional antenna around an axis substantially perpendicular to the antenna boresight; and
   a microprocessor configured to calculate an azimuthal rotation angle for pointing the directional antenna to at least one selected fixed transceiver based on:
   i. directional and positional data of the vehicle;
   ii. positional data of the selected fixed transceivers; and
   iii. a route for navigating the vehicle between a starting point and a destination;
   wherein the azimuthal rotation angle of the directional antenna is calculated continuously or at intervals, such that the signal strength from the mobile network is continuously optimized along the route.

2. The antenna device according to item 1, wherein the antenna device, in a second operation mode, is configured to rotate the directional antenna to scan for and identifying fixed transceivers of the mobile network, and for each identified fixed transceiver measuring a parameter related to a signal strength, a signal quality or an obtainable data rate between the fixed transceiver and the antenna device for a number azimuthal positions.

3. The antenna device according to item 2, wherein the rotation and measurements of the second operation mode are performed for a plurality of geographical positions along the route.

4. The antenna device according to any of items 2-3, further comprising a switch for switching between the first and second operation modes.

5. The antenna device according to any of items 2-4, wherein the antenna device, in the second operation mode, is configured to generate a directional map of signal strengths, signal quality and/or obtainable data rates along the route.

6. The antenna device according to item 5, wherein the directional map along the route comprises a number of strength/quality/data rate parameters for a plurality of directions and for a plurality of geographical positions along the route.

7. The antenna device according to any of items 5-6, wherein the directional map is used by the microprocessor in the first operation mode.

8. The antenna device according to any of the preceding items, wherein the route is obtained from a built-in navigation system in the vehicle, or a mobile device, such as a phone or tablet, or a predefined route stored in the vehicle or the antenna device.

9. The antenna device according to any of the preceding items, wherein the antenna device is configured to operate using a communication standard or protocol selected from GSM, UMTS, LTE and 5G protocols, and wherein the antenna device is configured to operate in the range of 700-2600 MHz, or specifically in the range of 1600-2800 MHz or in the range of 1800-2600 MHz.

10. The antenna device according to any of the preceding items, wherein the antenna device is configured to operate in a public cellular network.

11. The antenna device according to any of the preceding items, wherein the route is used for selecting the fixed transceiver that the directional antenna is pointed to.

12. The antenna device according to any of the preceding items, wherein for each point along the route, the transceiver that the directional antenna should be pointed to is determined prior to departure based on the route.

13. The antenna device according to any of the preceding items, wherein the next transceiver the directional antenna is pointed to is determined based on the route, such that the transceiver is located in the general direction of travel of the vehicle.

14. The antenna device according to any of the preceding items, wherein the route is calculated based on geographical connectivity data such that the risk of low or no connectivity along the route is low.

15. The antenna device according to any of the preceding items, wherein the directional and positional data of the vehicle are obtained from a geographical positioning device, such as a GPS.

16. The antenna device according to item 15, wherein the geographical positioning device is an integral part of the antenna device.

17. The antenna device according to item 15 [0084], wherein the geographical positioning device is part of the vehicle.

18. The antenna device according to any of the preceding items, wherein the directional data is obtained from a compass or magnetometer.

19. The antenna device according to item 18, wherein the compass or magnetometer is an integral part of the antenna device.

20. The antenna device according to item 18, wherein the compass or magnetometer is part of the vehicle.

21. The antenna device according to any of the preceding items, wherein the signal from the directional antenna is provided to a wireless modem, such as a 3G/4G/LTE/5G modem, or a receiving element, such as a socket, arranged to receive an external wireless modem.

22. The antenna device according to any of the preceding items, wherein the signal from the antenna device is used for creating a wireless network, such as a Wi-Fi hotspot, in and around the vehicle.

23. The antenna device according to any of the preceding items, wherein the signal from the antenna device is used for a wired connection, such as an Ethernet connection, to the vehicle and/or devices in the vehicle.

24. The antenna device according to any of the preceding items, wherein the antenna device is configured for operation in frequencies in the range of 500 MHz to 60 GHz, or in the range of 700-2600 MHz.

25. The antenna device according to any of the preceding items, wherein the directional antenna is a Vivaldi antenna, preferably made of dielectric plate metalized on both sides.

26. The antenna device according to any of the preceding items, wherein the directional antenna is fabricated on a printed circuit board.

27. The antenna device according to any of the preceding items, wherein the directional antenna is mounted on the upper side of a printed circuit board and additional components are mounted on the back side of the printed circuit board.

28. The antenna device according to any of the preceding items, further configured for combining the directional signal with an omnidirectional antenna signal.

29. The antenna device according to item 28, wherein an omnidirectional antenna is an integral part of the antenna device.

30. The antenna device according to item 28, wherein an omnidirectional antenna is part of the vehicle.

31. The antenna device according to any of items 28 to 30, configured to detect the signal strength of the transceivers by means of the omnidirectional antenna signal to determine which transceiver the directional antenna should be pointed to.

32. The antenna device according to any of items 28 to 31, wherein the omnidirectional antenna may be used for providing the signal when the signal strength from the directional antenna is low.

33. The antenna device according to any of the preceding items, further comprising at least a second rotatable directional antenna.

34. The antenna device according to item 33, wherein the second directional antenna is configured for pointing to a different transceiver than the selected transceiver for the first directional antenna.

35. The antenna device according to any of items 33 to 34, wherein the first rotational axis of the first directional antenna is different from the rotational axis of the second directional antenna.

36. The antenna device according to any of items 33 to 35, configured for maintaining the connection through one directional antenna when the other directional antenna is rotated to point and connect to a different transceiver.

37. The antenna device according to any of items 33 to 36, wherein the two directional antennas are used for carrier aggregation or for bundling the signals.

38. The antenna device according to items 33-37 and item 5, wherein the first rotatable directional antenna is used for maintaining an optimized data connection and wherein the second rotatable directional antenna is used for generating the directional map of signal strengths, signal quality and/or obtainable data rates along the route.

39. The antenna device according to any of items 33-38, wherein the first rotatable directional antenna is associated with a first international mobile subscriber identity (IMSI), preferably wherein the first international mobile subscriber identity is stored in a first subscriber identification module (SIM), and the second rotatable directional antenna is associated with a second international mobile subscriber identity, preferably wherein the second international mobile subscriber identity is stored in a second subscriber identification module.

40. The antenna device according to any of the preceding items, wherein the antenna device is configured for storing data from previous routes to optimize the connectivity when the route, or a part thereof, is navigated again.

41. The antenna device according to any of the preceding items, further comprising at least one gyroscope for determining the direction of travel of the vehicle.

42. The antenna device according to item 41, wherein the at least one gyroscope is used to assist and or verify the direction of travel obtained from the geographical positioning device and/or magnetometer.

43. The antenna device according to any of items 41 to 42, wherein the at least one gyroscope is further configured for detecting the pitch or tilt of the vehicle, and wherein the antenna device is configured for compensating said pitch or tilt.

44. The antenna device according to any of the preceding items, further comprising a gimbal for maintaining the device in a horizontal position.

45. The antenna device according to any of the preceding items, wherein the device is arranged such that rotation of the directional antenna more than a predefined angle, such as 360° or 540° or 720°, is prevented.

46. The antenna device according to item 45, wherein the antenna is rotated 360°, or a value corresponding to the predefined angle, backwards when the predefined angle is reached.

47. The antenna device according to any of the preceding items, wherein the selected fixed transceiver corresponds to the fixed transceiver associated with a cell which the device camps on.

48. A vehicle equipped with the antenna device according to any of the preceding items.

49. A directional wireless hotspot device for communication in a mobile network having a number of distributed cells, each cell covered by at least one fixed transceiver, the device comprising:
at least one printed circuit board;
at least two directional antennas;
at least one compass, such as a magnetometer;
at least one geographical positioning device, such as a GPS receiver;
at least one electric motor, such as a substantially flat piezoelectric motor, for rotating the at least two directional antennas;
at least one wireless modem, such as a 3G/4G/LTE/5G modem, or a receiving element, such as a socket, arranged to receive an external wireless modem;
at least one local communication element, such as a Wi-Fi circuit, for communication with a local device;
at least one microprocessor configured to calculate an azimuthal rotation angle for pointing the directional antennas to at least one of the fixed transceivers based on:
  i. directional and positional data from the compass and geographical positioning device;
  ii. positional data of the fixed transceivers;
wherein the rotational axes of the at least two directional antennas do not coincide and wherein the at least two antennas are configured to rotate independently.

50. The directional wireless hotspot device according to item 49, wherein the at least two antennas are pointing to at least two different transceivers.

51. The directional wireless hotspot device according to any of items 49 to 50, wherein the device is configured for maintaining the connection through one antenna when the other is rotated to point and connect to a different transceiver.

52. The directional wireless hotspot device according to any of items 49 [00118] to 51, wherein the at least two antennas are used for carrier aggregation or for bundling the signals.

53. A method for automatically pointing a directional antenna on a vehicle to a fixed transceiver in a mobile network for optimizing the signal strength, the method comprising the steps of:
obtaining the geographical position and/or direction of travel and/or speed of the vehicle;
obtaining or extracting the geographical position for at least one fixed transceiver;
obtaining a reference azimuth corresponding to the direction of the directional antenna in a horizontal plane;
calculating a pointing azimuth between the vehicle and a selected fixed transceiver based on:
  i. the geographical positions for the selected fixed transceiver and the vehicle; and
  ii. a calculated route for navigating between a starting point and a destination;
calculating an azimuthal rotation angle between the reference azimuth and the pointing azimuth;
rotating the directional antenna towards the selected fixed transceiver based on the calculated azimuthal rotation angle; and
continuously, or at intervals, repeating the previous steps of the method.

54. The method according to item 54, wherein the method is used for automatically pointing a directional antenna according to any of items 1 to 47.

The invention claimed is:
1. An antenna device for a vehicle for optimizing the signal strength from a mobile network having at least one fixed transceiver, the device comprising:
at least one directional antenna;
at least one turning device, for rotating the directional antenna around an axis substantially perpendicular to the antenna boresight; and a microprocessor configured to calculate, in a first operation mode, an azimuthal rotation angle for pointing the directional antenna to at least one selected fixed transceiver based on:
  i. directional and positional data of the vehicle;
  ii. positional data of the selected fixed transceivers or information about a signal strength or signal quality for different directions along the route; and
  iii. a route for navigating the vehicle between a starting point and a destination;
wherein the azimuthal rotation angle of the directional antenna is calculated continuously or at intervals, such that the signal strength or quality from the mobile network is continuously optimized along the route,
wherein the antenna device, in a second operation mode, is configured to rotate the directional antenna to scan for and identify fixed transceivers of the mobile network, each identified fixed transceiver measuring a parameter related to a signal strength, a signal quality or an obtainable data rate between the fixed transceiver and the antenna device for a number of azimuthal positions, and
wherein the antenna device, in the second operation mode, is configured to generate a directional map of signal strengths, signal quality and/or obtainable data rates along the route.

2. The antenna device according to claim 1, wherein the rotation and measurements of the second operation mode are performed for a plurality of geographical positions along the route.

3. The antenna device according to claim 1, further comprising a switch for switching between the first and second operation modes.

4. The antenna device according to claim 1, wherein the directional map along the route comprises a number of strength/quality/data rate parameters for a plurality of directions and for a plurality of geographical positions along the route.

5. The antenna device according to claim 1, wherein the directional map is used by the microprocessor in the first operation mode.

6. The antenna device according to claim 1, configured to use the route for selecting the fixed transceiver that the directional antenna is pointed to.

7. The antenna device according to claim 1, wherein the antenna device is configured to operate using a communication standard or protocol selected from GSM, UMTS, LTE, 5G and WLAN protocols, and wherein the antenna device is configured to operate in the range of 600 MHz to 6 GHz.

8. The antenna device according to claim 1, configured such that the selection of the next transceiver the directional antenna is pointed to is determined based on the route, such that the transceiver is located in the general direction of travel of the vehicle.

9. The antenna device according to claim 1, wherein the signal from the directional antenna is provided to a wireless modem, or a receiving element, arranged to receive an external wireless modem.

10. The antenna device according to claim 1, wherein the signal from the antenna device is used for creating a wireless network, in and around the vehicle.

11. An antenna device for a vehicle for optimizing the signal strength from a mobile network having at least one fixed transceiver, the device comprising:
at least one first directional antenna;
at least one turning device, for rotating the first directional antenna around a first axis substantially perpendicular to the antenna boresight;
a microprocessor configured to calculate, in a first operation mode, an azimuthal rotation angle for pointing the first directional antenna to at least one selected fixed transceiver based on:
  i. directional and positional data of the vehicle;
  ii. positional data of the selected fixed transceivers or information about a signal strength or signal quality for different directions along the route; and
  iii. a route for navigating the vehicle between a starting point and a destination; and
at least a second rotatable directional antenna wherein the first and second rotatable antennas are configured to rotate independently of each other:
wherein the first rotatable directional antenna is used for maintaining an optimized data connection and wherein the second rotatable directional antenna is used for generating a directional map of signal strengths, signal quality and/or obtainable data rates along the route.

12. The antenna device according to claim 11, wherein the first rotatable directional antenna is associated with a first international mobile subscriber identity (IMSI), and the second rotatable directional antenna is associated with a second international mobile subscriber identity.

13. The antenna device according to claim 11, wherein the first rotational axis of the first directional antenna is different from a rotational axis of the second directional antenna.

14. The antenna device according to claim 11, configured for maintaining the connection through one directional antenna when the other directional antenna is rotated to point and connect to a different transceiver.

15. The antenna device according to claim 1, configured for storing data from previous routes to optimize the connectivity when the route, or a part thereof, is navigated again.

16. A method for automatically pointing a directional antenna on a vehicle to a fixed transceiver in a mobile network for optimizing the signal strength or quality, the method comprising the steps of:
obtaining the geographical position and/or direction of travel and/or speed of the vehicle;
obtaining or extracting the geographical position for at least one fixed transceiver;
obtaining a reference azimuth corresponding to the direction of the directional antenna in a horizontal plane;
calculating a pointing azimuth between the vehicle and a selected fixed transceiver based on:
  i. the geographical positions for the selected fixed transceiver and the vehicle; and
  ii. a calculated route for navigating between a starting point and a destination;
calculating an azimuthal rotation angle between the reference azimuth and the pointing azimuth;
rotating the directional antenna towards the selected fixed transceiver based on the calculated azimuthal rotation angle;
continuously, or at intervals, repeating the previous steps of the method; and
in a second operation mode, rotating the directional antenna, or a second directional antenna, to scan for and identify fixed transceivers of the mobile network, and for each identified fixed transceiver, measuring a parameter related to a signal strength, a signal quality or an obtainable data rate between the fixed transceiver and the directional antenna, or the second directional antenna, for a number azimuthal positions, and generating a directional map of signal strengths, signal quality and/or obtainable data rates along the route.

17. The antenna device according to claim 1, wherein the at least one turning device is a motor.

18. The antenna device according to claim 9, wherein the wireless modem is a 3G/4G/LTE/5G modem.

19. The antenna device according to claim 9, wherein the receiving element is a socket.

20. The antenna device according to claim 10, wherein the wireless network, is a Wi-Fi hotspot.

* * * * *